Patented Jan. 14, 1936

2,028,086

UNITED STATES PATENT OFFICE 2,028,086

VULCANIZATION OF RUBBER

William C. Calvert and Howard I. Cramer, Cuyahoga Falls, Ohio, assignors to Wingfoot Corporation, Wilmington, Del., a corporation of Delaware No Drawing. Application July 13, 1932,
Serial No. 622,312

15 Claims. (Cl. 18—53)

This invention pertains to a novel method of manufacturing unsymmetrically substituted alkylene diamines and to their use in rubber.

Heretofore it has been possible to prepare unsymmetrically substituted alkylene diamines by the methods proposed by Gabriel, Berichte 22, 2223 (1889), and Gabriel and Stelzner, Berichte 28, 2935 (1895). The syntheses of the unsymmetrically substituted alkylene diamines by these methods are, however, time consuming and expensive. They entail many operations and give rise to comparatively poor yields. Thus these methods, while heretofore employed for the reason that better methods have not been available, are more or less undesirable.

The method of the present invention may be considered as taking place in two steps, of which the first involves the preparation of the desired mono or disubstituted amino aceto nitrile and of which the second is the hydrogenation of the nitrile to the desired diamine. The amino aceto nitriles used in the practice of the present invention may be conveniently prepared by reacting the aldehyde or ketone addition product of a bisulphite with an amine, and reacting the resulting compound with an alkali cyanide according to the method of Knoenenagel, Berichte 37, 4073–4094 (1904). According to the latter method, an alkali metal bisulphite is reacted with an aldehyde or ketone to give an addition product, which is treated with an amine to give a product which is further reacted upon by a metal cyanide. The following reactions are involved in the preparation of the nitrile according to this method.

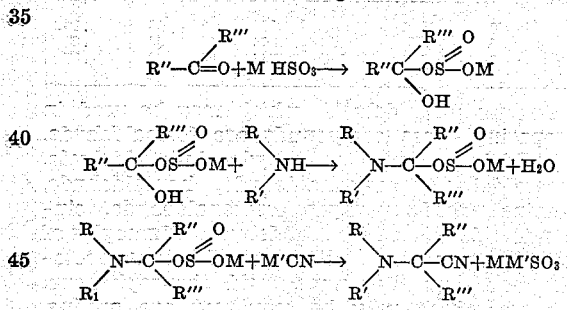

R may be hydrogen or any alkyl, aryl, aralkyl or alicyclic group and R' may be hydrogen, alkyl, aryl, aralkyl, alicyclic or combined with R as a polymethylene group. R" and R''' may be hydrogen or any alkyl, aryl, aralkyl, or alicyclic group and may be the same or different.

In place of the above procedure, the method of the Tiemann, Berichte 12, 2034–2039 (1882), may be employed, using either aldehydes or ketones. According to this method a metal cyanide is allowed to react therewith in the presence of a mineral acid, giving a product which, upon treatment with a primary or secondary amine, gives rise to the desired nitrile. The following equations, using HCl as the mineral acid, illustrate the reactions which are believed to take place.

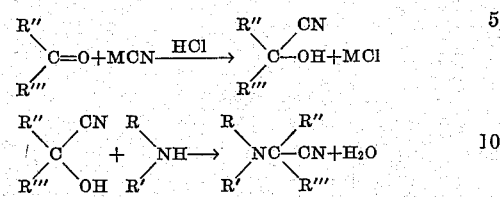

A nitrile so prepared may be conveniently hydrogenated under pressure in an autoclave in the presence of a catalyst. In general the pressure may vary from 90 to 140 atmospheres. Preferably, the catalyst employed is a reduced nickel-kieselguhr catalyst present in approximately 10% of the amount of the nitrile to be hydrogenated, although it is to be understood that any hydrogenating catalyst capable of reducing a nitrile may be used also.

As a specific illustration of the process of preparing these new compounds, a mixture of 72 grams of 37% formaldehyde and 95 grams of sodium meta bisulphite in 150 cc. of water may be heated at 50–60 degrees C. until the odor of the formaldehyde has disappeared. Ortho toluidine in the amount of 107 grams is then added, after which the heating is continued until the ortho toluidine is dissolved. A solution of 50 grams of sodium cyanide in 150 cc. of water is then added, the heating being continued for about 30 minutes at 90 degrees C.

The reaction product, which is in the nature of an oily material, is thereafter separated, filtered and washed. The yield of this product is in the neighborhood of 126 grams, the product being ortho-toluidino-aceto-nitrile. Reducing the same catalytically with hydrogen gives a yield of approximately 41.5 percent of ortho-tolyl ethylene diamine boiling at from 118 to 125 degrees C. at 4 mm. pressure.

As another example, a mixture of 162 grams of 37% formaldehyde solution may be treated with a solution of 190 grams of sodium meta sulphite ($Na_2S_2O_5$) in 300 cc. of water, the mixture being warmed in a steam bath until the odor of formaldehyde can no longer be detected. Aniline is thereafter added in the amount of 186 grams, after which the solution is stirred and warmed until it becomes homogeneous. Thereafter a solution of 100 grams of sodium cyanide in 300 cc. of water is added. The resulting reaction mixture is heated again on the steam bath for approximately one hour. The product, phenyl amino aceto nitrile, forms as an oil which, upon chilling in an ice bath, solidifies as a crystalline mass. The solid may be filtered cold and dried in a vacuum. The crude material, upon recrystallization, should melt in the neighborhood of 47–48 degrees C. and should be present in an amount approximately 87% of the theoretical yield. The product should be hydrogenated as before.

The hydrogenation may conveniently be accomplished by reacting 150 grams of the nitrile dissolved in 200 cc. of dry ether with hydrogen under pressure. The reaction is carried out in a high pressure autoclave in the presence of 15 grams of a reduced nickel-kieselguhr catalyst at a temperature ranging from 100 to 150 degrees, but preferably at approximately 125 degrees C. The heating is continued until absorption of hydrogen ceases, the hydrogen absorption being measured by pressure drop. Conveniently, the pressure of hydrogen may vary between 90 and 140 atmospheres. In the case of the phenyl aceto nitrile, a yield of approximately 40% of phenyl ethylene diamine boiling at 112–115 degrees C. at 4 mm. should be obtained.

The hydrogenation of ortho tolyl amino aceto nitrile and para tolyl amino aceto nitrile, as well as numerous related compounds, may be similarly accomplished. The following table shows the yield and the observed and previously recorded boiling points for the compounds referred to, more particularly phenyl ethylene diamine, ortho tolyl ethylene diamine and para tolyl ethylene diamine:

| Amine | Yield percent | Boiling points | | M. P.'s dibenzoyl der. | |
|---|---|---|---|---|---|
| | | Observed | Recorded | Observed | Recorded |
| Phenyl ethylene diamine | 40.7 | 112–15°/4 mm. | 262–4° | 146–7° | 147.5° |
| Ortho tolyl ethylene diamine | 44.0 | 121–2°/4 mm. | 267° | 167–8° | 164.5° |
| Para tolyl ethylene diamine | 43.4 | 110–5°/2–3 mm. | | 162.0° | 161.0° |

The reference to the melting point of the dibenzoyl derivative is for the purpose of showing the identity of the material prepared. The identity is determined by converting a portion of the diamines to the dibenzoyl derivatives and comparing the melting points with the known values therefor.

It has been found that the unsymmetrically substituted diamines so obtained are highly satisfactory as accelerators of the vulcanization of rubber. They may be compounded in any of the familiar rubber formulæ without disturbing the so-called balance of the compound. For purposes of illustration, they have been compounded in a formula employing 100 parts of extracted pale crepe, 5 parts zinc oxide, 3 parts sulfur, 1.5 parts stearic acid and .5 part diamine.

In the case of ortho tolyl ethylene diamine, the following data were obtained on testing compounds so made up:

| Cure | | Ultimate tensile | Maximum elongation | Tensile at | |
|---|---|---|---|---|---|
| Time in mins. | Temp. °F. | | | 500% | 700% |
| 20 | 260 | 30 | 835 | 7 | 16 |
| 40 | 260 | 90 | 955 | 9 | 24 |
| 80 | 260 | 124 | 805 | 19 | 65 |
| 60 | 285 | 156 | 775 | 27 | 99 |

After ageing in an oxygen bomb for 6 days at 50 degrees C. and 150 pounds pressure, the following results were obtained.

| Cure | | Ultimate tensile | Maximum elongation | Tensile at | | Percent weight increase |
|---|---|---|---|---|---|---|
| Time in mins. | Temp. °F. | | | 500% | 700% | |
| 20 | 260 | 9 | 680 | 6 | | .36 |
| 40 | 260 | 54 | 855 | 10 | 24 | .36 |
| 80 | 260 | 92 | 745 | 20 | 73 | .62 |
| 60 | 285 | 40 | 550 | 31 | | 3.40 |

Phenyl ethylene diamine tested as follows before ageing:

| Cure | | Ultimate tensile | Maximum elongation | Tensile at | |
|---|---|---|---|---|---|
| Time in mins. | Temp. °F. | | | 500% | 700% |
| 40 | 260 | 62 | 920 | 10 | 21 |
| 80 | 260 | 122 | 870 | 16 | 48 |
| 60 | 285 | 162 | 800 | 25 | 90 |

Ageing in an oxygen bomb for 6 days at 50 degrees C. and 150 pounds pressure gave the following results:

| Cure | | Ultimate tensile | Maximum elongation | Tensile at | | Percent weight increase |
|---|---|---|---|---|---|---|
| Time in mins. | Temp. °F. | | | 500% | 700% | |
| 40 | 260 | 49 | 875 | 6 | 18 | .19 |
| 80 | 260 | 102 | 805 | 14 | 53 | .24 |
| 60 | 285 | 122 | 755 | 25 | 90 | .87 |

Among the aldehydes which may be used in preparing these compounds are formaldehyde, acetaldehyde, propionaldehyde, butyraldehyde, valeraldehyde, caproicaldehyde, heptaldehyde, cuminol, furfuraldehyde, crotonaldehyde, cinnamic aldehyde and benzaldehyde. Examples of ketones are acetone, ethyl methyl ketone, acetophenone, cyclohexanone and benzophenone. Amines which may be employed are aniline, orthotoluidine, paratoluidine, xylidine, alpha naphthylamine, tetra hydro quinoline, decahydro quinoline, beta naphthylamine, diphenyl amine, ditolyl amine, dixylylamine, methyl aniline, ethyl aniline, butyl aniline, isopropyl aniline, phenyl alpha naphthylamine, phenyl beta naphthylamine, methyl amine, ethyl amine, butyl amine, pipecolines, cyclohexyl amine, piperidine, dimethyl amine, dibutyl amine, dicyclohexyl amine, benzyl amine, and dibenzyl amine. Obviously, other compounds related to those mentioned may also be employed.

The details of the invention as herein set forth may be varied within wide limits without departing from the spirit of the invention. It will accordingly be understood that it is desired to embrace within the scope of this invention such modifications and changes as may be necessary to adapt it to varying conditions and uses. It is intended that the patent shall cover, by suitable expression in the appended claims, whatever features of patentable novelty reside in the invention.

What we claim is:

1. A process of treating rubber which comprises vulcanizing it in the presence of ortho-tolyl-ethylene diamine.

2. As a new composition of matter, rubber which has been vulcanized in the presence of a compound having the formula

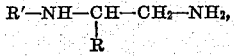

wherein R' is a hydrocarbon radical and R is hydrogen or hydrocarbon.

3. As a new composition of matter, rubber which has been vulcanized in the presence of ortho-tolyl-ethylene diamine.

4. A composition of matter comprising a rubber stock containing ortho-tolyl-ethylene diamine.

5. A compounded rubber stock wherein the accelerator is ortho-tolyl-ethylene diamine.

6. The process of treating rubber which comprises vulcanizing it in the presence of a compound of the formula

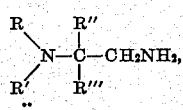

wherein R is a hydrocarbon radical and R', R'' and R''' are radicals selected from the group consisting of hydrogen and hydrocarbon radicals.

7. The process of treating rubber which comprises vulcanizing it in the presence of a compound of the formula

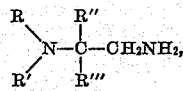

wherein R is an aryl hydrocarbon radical of the benzene and naphthalene series and R', R'' and R''' are radicals selected from the group consisting of hydrogen and hydrocarbon radicals.

8. The process of treating rubber which comprises vulcanizing it in the presence of a compound of the formula

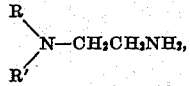

wherein R is a hydrocarbon radical and R' is hydrogen or hydrocarbon.

9. The process of treating rubber which comprises vulcanizing it in the presence of a compound of the formula $RNH-CH_2CH_2NH_2$, wherein R is a hydrocarbon radical.

10. The process of treating rubber which comprises vulcanizing it in the presence of a compound of the formula $RNH-CH_2CH_2NH_2$, wherein R is an aryl hydrocarbon radical of the benzene and naphthalene series.

11. The process of treating rubber which comprises vulcanizing it in the presence of an ethylene diamine substituted in only one amino group and therein by at least one hydrocarbon radical.

12. The process of treating rubber which comprises vulcanizing it in the presence of an ethylene diamine substituted in only one amino group and therein by at least one aryl hydrocarbon radical of the benzene and naphthalene series.

13. The process of treating rubber which comprises vulcanizing it in the presence of an ethylene diamine substituted in only one amino group and therein by an aryl hydrocarbon radical of the benzene and naphthalene series.

14. The process of treating rubber which comprises vulcanizing it in the presence of an ethylene diamine substituted in only one amino group and therein by a phenyl radical.

15. A rubber product which has been vulcanized in the presence of an ethylene diamine substituted in only one amino group and therein by at least one hydrocarbon radical.

WILLIAM C. CALVERT.
HOWARD I. CRAMER.